US009994329B2

(12) United States Patent
Luo

(10) Patent No.: US 9,994,329 B2
(45) Date of Patent: Jun. 12, 2018

(54) METHOD AND APPARATUS FOR CONTROLLING AIRCRAFT

(71) Applicant: CLOUDMINDS (SHENZHEN) ROBOTICS SYSTEMS CO., LTD., Beijing (CN)

(72) Inventor: Lei Luo, Beijing (CN)

(73) Assignee: CLOUDMINDS (SHENZHEN) ROBOTICS SYSTEMS CO., LTD., Beijing (CN)

( * ) Notice: Subject to any disclaimer, the term of this patent is extended or adjusted under 35 U.S.C. 154(b) by 0 days. days.

(21) Appl. No.: 15/658,772

(22) Filed: Jul. 25, 2017

(65) Prior Publication Data

US 2017/0334568 A1 Nov. 23, 2017

Related U.S. Application Data

(63) Continuation of application No. PCT/CN2016/077351, filed on Mar. 25, 2016.

(51) Int. Cl.
*B64C 39/02* (2006.01)
*B64D 25/00* (2006.01)
*G01S 17/93* (2006.01)

(52) U.S. Cl.
CPC ............ *B64D 25/00* (2013.01); *B64C 39/024* (2013.01); *G01S 17/933* (2013.01)

(58) Field of Classification Search
CPC .................................................. B64D 25/00
See application file for complete search history.

(56) References Cited

U.S. PATENT DOCUMENTS

| 8,348,192 | B2 * | 1/2013 | Tho ........................ B64C 25/52 |
| | | | 244/100 A |
| 9,156,540 | B2 * | 10/2015 | Litwinowicz ........... B64C 19/00 |
| 9,257,051 | B2 * | 2/2016 | Farjon ................. G05D 1/0202 |
| 9,613,539 | B1 * | 4/2017 | Lindskog ................. G08G 5/04 |

(Continued)

FOREIGN PATENT DOCUMENTS

| AU | 5361396 A | 3/1997 |
| CA | 2201760 A1 | 2/1997 |

(Continued)

OTHER PUBLICATIONS

Written Opinion dated Jan. 3, 2017; PCT/CN2016/077351.

*Primary Examiner* — Thomas G Black
*Assistant Examiner* — Ce Li Li
(74) *Attorney, Agent, or Firm* — Ladas & Parry LLP

(57) ABSTRACT

A method and an apparatus for controlling an aircraft are disclosed. The method includes: determining a horizontal velocity $V_h$ and a vertical velocity $V_v$ of the aircraft; acquiring, along a moving direction of the aircraft, an object having a distance that is no greater than a preset distance L away from the aircraft; predicting, according to the horizontal velocity $V_h$, the vertical velocity $V_v$, and the preset distance L, a position relationship between the aircraft and the object after the aircraft flies the preset distance L; and controlling the aircraft, by using a preset control measure, if the position relationship meets a preset relationship.

12 Claims, 10 Drawing Sheets

(56) References Cited

U.S. PATENT DOCUMENTS

| | | | |
|---|---|---|---|
| 2008/0062011 A1* | 3/2008 | Butler | G01S 3/783 340/961 |
| 2009/0259402 A1* | 10/2009 | Gates | G08G 3/02 701/301 |
| 2010/0206983 A1 | 8/2010 | Tho | |
| 2012/0029738 A1* | 2/2012 | Brunetti | G08G 5/0078 701/11 |
| 2012/0101666 A1 | 4/2012 | Hill | |
| 2015/0134150 A1 | 5/2015 | Farjon | |
| 2016/0293022 A1* | 10/2016 | Bousquet | G01S 13/02 |

FOREIGN PATENT DOCUMENTS

| | | |
|---|---|---|
| CA | 2702547 A1 | 4/2009 |
| CA | 2767796 A1 | 2/2011 |
| CN | 1161097 A | 10/1997 |
| CN | 101835651 A | 9/2010 |
| CN | 102481980 A | 5/2012 |
| CN | 103377537 A | 10/2013 |
| CN | 104272364 A | 1/2015 |
| CN | 105353765 A | 2/2016 |
| DE | 07844510 T1 | 10/2010 |
| EP | 0787333 A1 | 8/1997 |
| EP | 2200852 A1 | 6/2010 |
| EP | 2460070 A1 | 6/2012 |
| EP | 2845180 A1 | 3/2015 |
| FR | 2990290 A1 | 11/2013 |
| JP | H10508110 A | 8/1998 |
| JP | 2013127694 A | 6/2013 |
| MX | 2014013126 A | 5/2015 |
| RU | 2581455 C1 | 4/2016 |
| WO | 9706500 A1 | 2/1997 |
| WO | 2009054844 A1 | 4/2009 |
| WO | 2011014152 A1 | 2/2011 |
| WO | 2013094526 A1 | 6/2013 |
| WO | 2013164237 A1 | 11/2013 |

* cited by examiner

METHOD AND APPARATUS FOR CONTROLLING AIRCRAFT

CROSS-REFERENCE TO RELATED APPLICATIONS

This application is a continuation of International Application No. PCT/CN2016/077351, with an international filing date of Mar. 25, 2016, the entire contents of all of which are incorporated herein by reference.

TECHNICAL FIELD

The present disclosure relates to the field of aircraft control technology, and particularly, to a method and an apparatus for controlling an aircraft.

BACKGROUND

Drones, also known as unmanned aerial vehicles, are unmanned aircrafts manipulated by radio remote control equipment and self-contained program control units. Unmanned aerial vehicles are equipped with no cockpit, but include facilities such as navigation flight control systems, program control devices, power equipment and power supply. Staffs in ground telemetering stations track, position, remote control, telemeter, and transmit data to the unmanned aerial vehicles through equipment such as data link. Compared with manned aircrafts, the unmanned aerial vehicles are small in size, low in manufacture cost, easy to use, and can adapt to various flying conditions, so they are widely used in aerial remote sensing, meteorological research, aerial sowing, pest control and warfare.

Aircrafts, represented by unmanned aerial vehicles, may crash when encountering mechanical breakdown or colliding with other objects, and the crash may fall on and damage passers-by or vehicles, causing injury and property loss. Thus, with the extensive use of the aircrafts represented by unmanned aerial vehicles, the control of the aircraft, especially the control of aircrafts during falling has become an urgent problem to be solved.

In related arts, the loss caused by the crash of aircraft can be reduced by preventing the fall of the aircraft.

SUMMARY

An embodiment of the present disclosure provides a method for controlling an aircraft. The method includes:
  determining a horizontal velocity $V_h$ and a vertical velocity $V_v$ of the aircraft;
  acquiring, along a moving direction of the aircraft, an object having a distance that is no greater than a preset distance L away from the aircraft;
  predicting, according to the horizontal velocity $V_h$, the vertical velocity $V_v$ and the preset distance L, a position relationship between the aircraft and the object after the aircraft flies the preset distance L; and
  controlling the aircraft, by using a preset control measure, if the position relationship meets a preset relationship;
  wherein the predicting, according to the horizontal velocity $V_h$, the vertical velocity $V_v$, and the preset distance L, a position relationship between the aircraft and the object after the aircraft flies the preset distance L includes:
  determining a first projection position of the aircraft in a probe plane;
  determining a scanning position of the object in the probe plane;
  a distance between the probe plane and the aircraft being L, and the probe plane being vertical to a moving direction of the aircraft;
  predicting, according to the first projection position, the horizontal velocity $V_h$, the vertical velocity $V_v$, and the preset distance L, a second projection position of the aircraft in the probe plane after the aircraft flies the preset distance L; and
  defining a position relationship between the second projection position and the scanning position as the position relationship between the aircraft and the object after the aircraft flies the preset distance L.

Another embodiment of the present disclosure provides an apparatus for controlling an aircraft. The apparatus includes:
  at least one processor; and
  a memory communicably connected with the at least one processor and storing one or more programs executable by the at least one processor, the one or more programs including:
  a first determining module, being configured to determine a horizontal velocity $V_h$ and a vertical velocity $V_v$ of an aircraft;
  an acquisition module, being configured to acquire an object along a falling direction of the aircraft, a distance between the object and the aircraft being no greater than a preset distance L;
  a prediction module, being configured to predict, according to the horizontal velocity $V_h$, the vertical velocity $V_v$, and the preset distance L determined by the first determining module, a position relationship between the aircraft and the object acquired by the acquisition module after the aircraft flies the preset distance L; and
  a control module, being configured to control the aircraft, by using a preset control measure, if the position relationship predicted by the prediction module meets a preset relationship;
  wherein the prediction module includes:
  a first determining unit, being configured to determine a first projection position of the aircraft in a probe plane, a distance between the probe plane and the aircraft being L, and the probe plane being vertical to a moving direction of the aircraft;
  a second determining unit, being configured to determine a scanning position of the object in the probe plane;
  a prediction unit, being configured to predict, according to the first projection position, the horizontal velocity $V_h$, the vertical velocity $V_v$, and the preset distance L determined by the first determining unit, a second projection position of the aircraft in the probe plane after the aircraft flies the preset distance L; and
  a third determining unit, being configured to define a position relationship between the second projection position predicted by the prediction unit and the scanning position determined by the second determining unit as the position relationship between the aircraft and the object after the aircraft flies the preset distance L.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

DETAILED DESCRIPTION

Currently, there is no way to control falling aircrafts, thus, they often inevitably collide with objects ahead, there is also no way to avoid casualties and property loss caused by falling on passers-by or vehicles. To reduce the damages caused by the aircrafts that is falling, the present application provides a method for controlling an aircraft, and the method can be applied to an apparatus for controlling an aircraft. The apparatus for controlling an aircraft is illustrated as shown in any one of FIGS. 15-19. The apparatus for controlling an aircraft is installed on an aircraft, and meanwhile, the aircraft can be equipped with a depth of field sensor; the probe direction of the depth of field sensor can be the same as the moving direction of the aircraft; when the aircraft is falling, the apparatus for controlling an aircraft can determine a horizontal velocity $V_h$ and a vertical velocity V of the aircraft, acquire an object having a distance that is no greater than a preset distance L away from the aircraft along the moving direction of the aircraft via the depth of field sensor, then predict, according to the horizontal velocity $V_h$, the vertical velocity and the preset distance L, a position relationship between the aircraft and the object after the aircraft flies the preset distance L, and control the aircraft, by using a preset control measure, if the position relationship meets a preset relationship, thus achieving the control of the aircraft after the falling happens.

Figure 1:
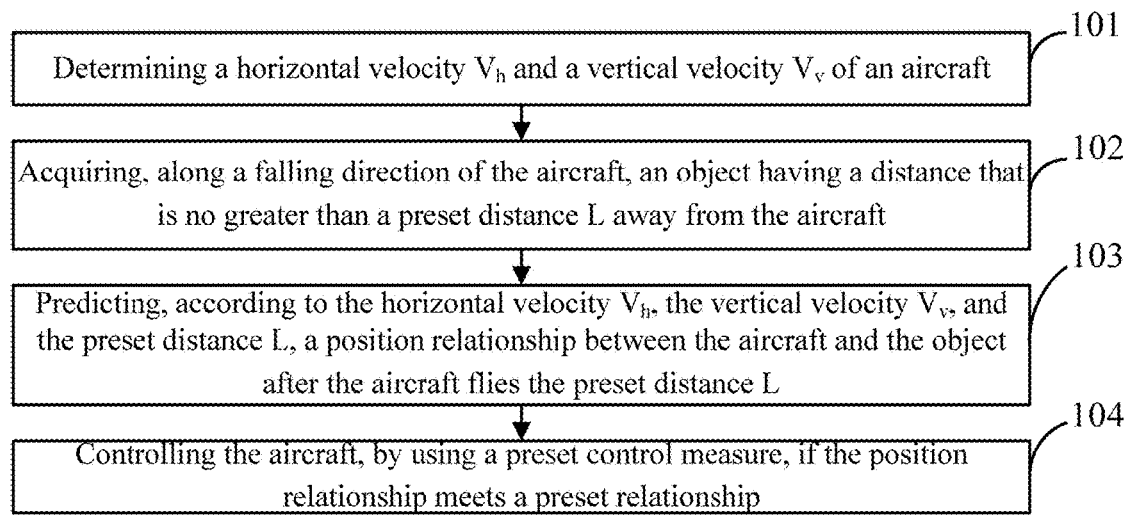
FIG. 1 is a flow chart of a method for controlling an aircraft according to one embodiment of the present disclosure.

In combination with the above implementation environment, an embodiment provides a method for controlling an aircraft, as shown in FIG. 1, the method provided by the present embodiment includes the following steps:

101. Determining a horizontal velocity $V_h$ and a vertical velocity $V_v$ of an aircraft.

In some embodiments, prior to the Determining a horizontal velocity $V_h$ and a vertical velocity $V_v$ of an aircraft, the method further includes:

determining fall of the aircraft.

102. Acquiring, along a moving direction of the aircraft, an object having a distance that is no greater than a preset distance L away from the aircraft.

In some embodiments, the aircraft is equipped with a depth of field sensor, and a probe direction of the depth of field sensor is the same as the moving direction of the aircraft;

acquiring, along a moving direction of the aircraft, an object having a distance that is no greater than a preset distance L away from the aircraft, includes:

acquiring an object probed by the depth of field sensor with the preset distance L as a depth of field.

103. Predicting, according to the horizontal velocity $V_h$, the vertical velocity $V_v$, and the preset distance L, a position relationship between the aircraft and the object after the aircraft flies the preset distance L.

In some embodiments, predicting, according to the horizontal velocity $V_h$, the vertical velocity $V_v$, and the preset distance L, a position relationship between the aircraft and the object after the aircraft flies the preset distance L includes:

determining a first projection position of the aircraft in a probe plane, determining a scanning position of the object in the probe plane, a distance between the probe plane and the aircraft being L, and the probe plane being vertical to a moving direction of the aircraft;

predicting, according to the first projection position, the horizontal velocity $V_h$, the vertical velocity $V_v$, and the preset distance L, a second projection position of the aircraft in the probe plane after the aircraft flies the preset distance L; and defining a position relationship between the second projection position and the scanning position as the position relationship between the aircraft and the object after the aircraft flies the preset distance L.

In some embodiments, determining a first projection position of the aircraft in a probe plane includes:

acquiring a three-dimensional size of the aircraft;

determining an angle between the depth of field sensor and an initial direction of the aircraft;

projecting the aircraft in the probe plane according to the three-dimensional size and the angle; and defining a projection position of the aircraft in the probe plane as the first projection position.

In some embodiments, predicting, according to the first projection position, the horizontal velocity $V_h$, the vertical velocity $V_v$, and the preset distance L, a second projection position of the aircraft in the probe plane after the aircraft flies the preset distance L includes:

predicting, according to the horizontal velocity $V_h$, the vertical velocity $V_v$, and the preset distance L, a longitudinal moving distance s of the aircraft in the probe plane after the aircraft flies the preset distance L; and defining a position of the first projection position after longitudinally moving the distance s as the second projection position.

In some embodiments, predicting, according to the horizontal velocity $V_h$, the vertical velocity $V_v$, and the preset distance L, a longitudinal moving distance s of the aircraft in the probe plane after the aircraft flies the preset distance L includes:

predicting the longitudinal moving distance s according to the following formula:

$$s = \frac{L \times \tan\left(\arctan\left((V_v + g \times L / \sqrt{V_h^2 + V_v^2})/V_h\right) - \arctan(V_v/V_h)\right)}{a}$$

in which, g is gravitational acceleration, and a is a preset scaled-down constant.

104. Controlling the aircraft, by using a preset control measure, if the position relationship meets a preset relationship.

In some embodiments, the preset control measure includes: ejecting a gasbag, or disintegrating the aircraft.

Advantages of the method for controlling an aircraft are summarized as follows. The method includes determining a horizontal velocity $V_h$ and a vertical velocity $V_v$ of an aircraft; acquiring, along a moving direction of the aircraft, an object which is no greater than a preset distance L away from the aircraft; predicting, according to the horizontal velocity $V_h$, the vertical velocity $V_v$, and the preset distance L, a position relationship between the aircraft and the object after the aircraft flies the preset distance L; and controlling the aircraft, by using a preset control measure, if the position relationship meets a preset relationship, thus achieving the control of an aircraft after the falling happens.

In combination with the above implementation environment, an embodiment provides a method for controlling an aircraft. Because the aircraft has a wide variety, convenient for illustrating, the embodiment merely takes an unmanned aerial vehicle and an object A as an example, and the distance between the object A and the unmanned aerial vehicle is no greater than a preset distance L.

Figure 2:
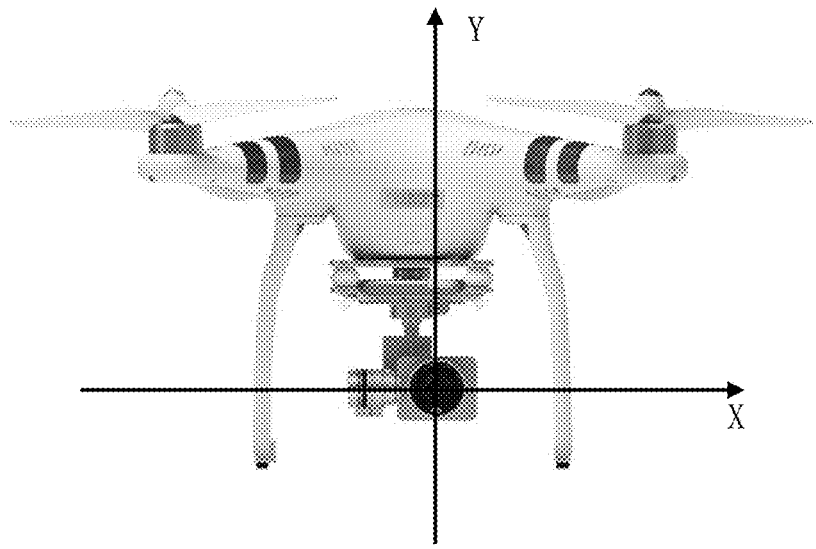
FIG. 2 is a schematic diagram of an unmanned aerial vehicle according to another embodiment of the present disclosure.

Wherein, as shown in FIG. 2, the unmanned aerial vehicle is equipped with an infrared laser depth of field sensor capable of 360-degree free rotation, and the probe direction of the infrared laser depth of field sensor capable of 360-degree free rotation is always the same as the moving direction of the unmanned aerial vehicle.

Figure 3:
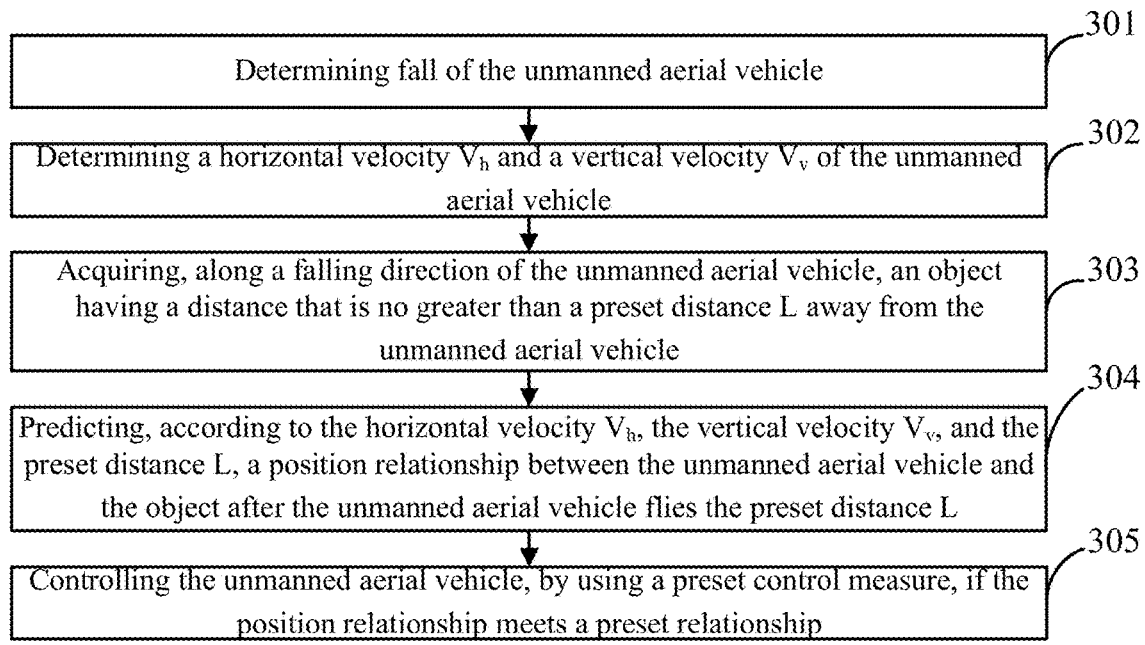
FIG. 3 is a flow chart of another method for controlling an aircraft according to another embodiment of the present disclosure.

As shown in FIG. 3, the method of the embodiment includes the following steps:

301. Determining fall of the unmanned aerial vehicle.

In the course of flight, the unmanned aerial vehicle (UAV) supervises its own status and the running conditions of the equipment and so on, and based on the supervision results, judges whether the UAV is falling, when it is judged that the UAV is falling, determines that the UAV is falling.

There are many reasons for the falling, for example, as shown in FIG. 2, the UAV mechanical failure, or collision during flight, or the like. Likewise, there are many falling manners of the UAV, for example, free fall, or fall caused by the stall of part propellers, or the like. In addition, in practical applications, different UAVs may have different accelerations during falling, in the present embodiment, there is no restriction on the specific falling acceleration of the UAVs.

302. Determining a horizontal velocity $V_h$ and a vertical velocity $V_v$ of the UAV.

Because the unmanned aerial vehicles are all equipped with devices and systems including Global Positioning System (GPS) and height sensors, in the present step, the horizontal velocity $V_h$ of the UAVs can be acquired by GPS, and the vertical velocity $V_v$ can be acquired by height sensors.

It should be note that, unless otherwise indicated, the velocities (including but not limited to flight velocity V, horizontal velocity $V_h$ and vertical velocity $V_v$) mentioned in the instant and follow-up embodiments are all vectors having both magnitudes and directions.

Furthermore, for the determination of the position of the unmanned aerial vehicle itself in the follow-up steps, after acquiring the horizontal velocity $V_h$ and the vertical velocity $V_v$, the flight velocity V of the unmanned aerial vehicle can be calculated according to the horizontal velocity $V_h$ and the vertical velocity $V_v$, to ascertain the velocity of the unmanned aerial vehicle in the three-dimensional space.

Figure 4:
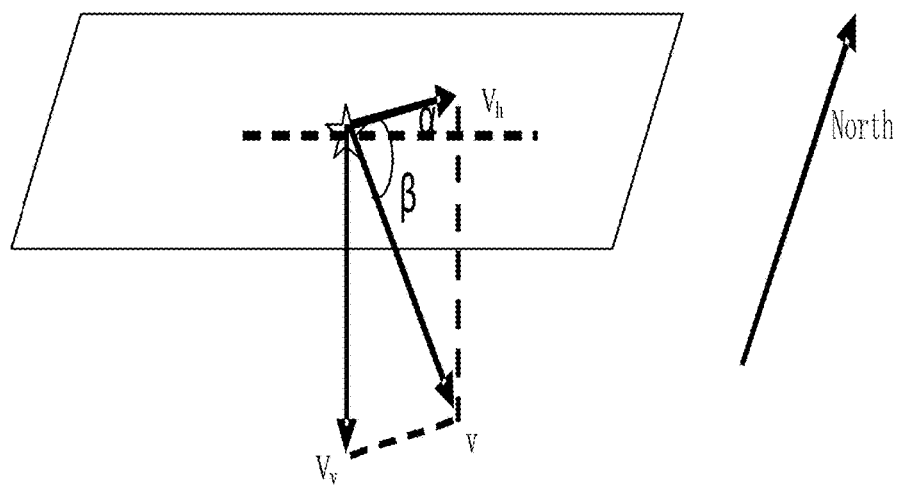
FIG. 4 is a schematic diagram of velocity of an unmanned aerial vehicle according to another embodiment of the present disclosure.

For example, if the direction of the horizontal velocity $V_h$ is α degree north by east, the flight velocity V is the current actual velocity of the unmanned aerial vehicle, the direction of the flight velocity V is horizontally downward and forms an included angle of β degree with the horizontal plane, as shown in FIG. 4.

In some exemplary embodiments, $v = \sqrt{(v_h^2 + v_v^2)}$, $\beta = \arctan(v_v/v_h)$ Certainly, the unmanned aerial vehicle can measure and calculate the current flight velocity in real time, so the velocity V can be also acquired from corresponding measuring equipment of the unmanned aerial vehicle directly.

303. Acquiring an object along a moving direction of the unmanned aerial vehicle, a distance between the object and the unmanned aerial vehicle being no greater than a preset distance L.

Because the probe direction of the infrared laser depth of field sensor capable of 360-degree free rotation in FIG. 2 is always the same as the moving direction of the unmanned aerial vehicle, the present step can be achieved by acquiring an object which is probed by the infrared laser depth of field sensor capable of 360-degree free rotation with the distance L as a depth of field.

Figure 5:
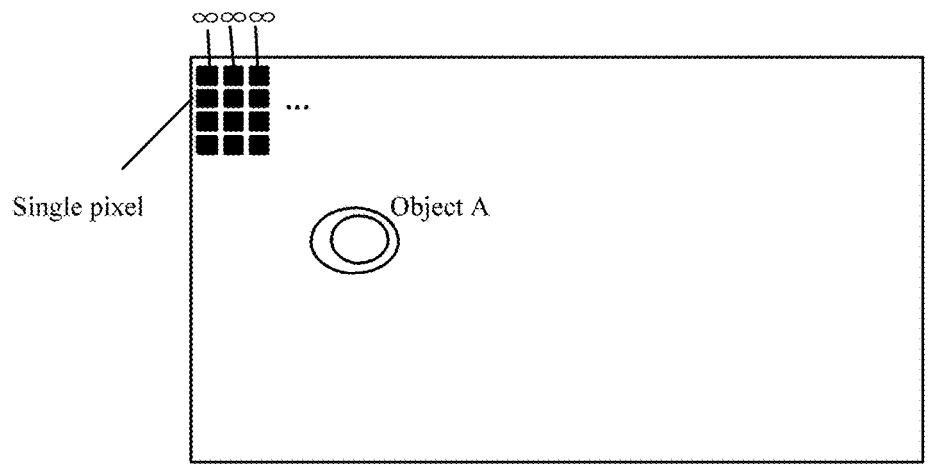
FIG. 5 is an obstacle information diagram according to another embodiment of the present disclosure.
Figure 6:
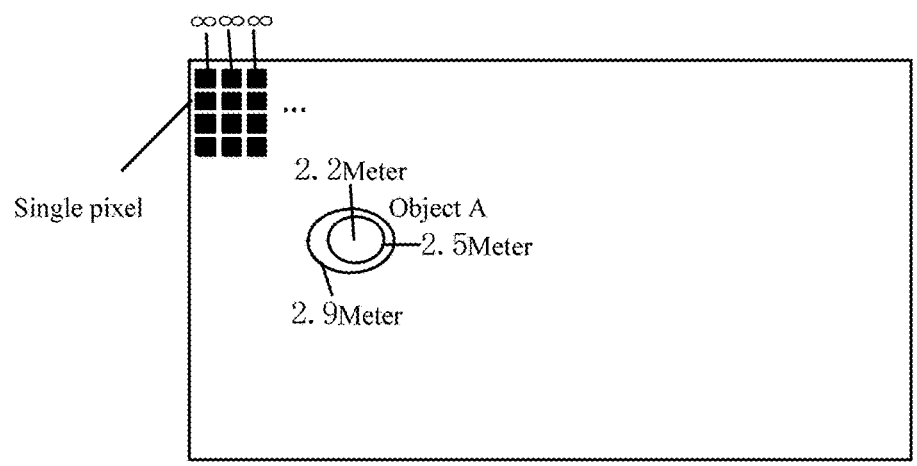
FIG. 6 is a three-dimensional obstacle information diagram according to another embodiment of the present disclosure.

For example, the infrared laser depth of field sensor capable of 360-degree free rotation performs real-time depth of field scanning within the distance L, herein suppose L is the farthest scanning distance, to yield an obstacle information diagram as shown in FIG. 5. The infrared laser depth of field sensor capable of 360-degree free rotation can also perform distance measurement of the visible region, the pixel point d of undetected objects is ∞, if the pixel point of the objects A is detected, record the distance information d (0-L) of the pixel point. The distance information of all pixel points is depicted to yield a three-dimensional obstacle information diagram as shown in FIG. 6.

In addition, that the probe direction of the infrared laser depth of field sensor capable of 360-degree free rotation is always the same as the moving direction of the unmanned aerial vehicle can be achieved according to the following implementation mode: the infrared laser depth of field sensor capable of 360-degree free rotation can automatically adjust itself so as to align to the αdegree east by north in the horizontal direction according to its own geomagnetic sensor, and then rotate by the angle β along the direction vertical to the geocenter, at this point, even if the unmanned aerial vehicle rotates or rolls during falling, the infrared laser depth of field sensor capable of 360-degree free rotation can always follow the absolute direction of the velocity of the unmanned aerial vehicle based on the two absolute angle values α, β.

Certainly, the embodiment merely takes the detection of the infrared laser depth of field sensor capable of 360-degree free rotation as an example for description, in practical applications, the unmanned aerial vehicle can be equipped with other kinds of depth of field sensors, as long as the sensors can probe the objects with the preset distance L as a depth of field and rotate freely within 360 degrees, so as to ensure the probe direction of the sensor is always the same as the moving direction of the unmanned aerial vehicle.

304. Predicting, according to the horizontal velocity $V_h$, the vertical velocity $V_v$, and the preset distance L, a position relationship between the unmanned aerial vehicle and the object after the unmanned aerial vehicle flies the preset distance L.

In some exemplary embodiments, the implementation includes but is not limited to the following four steps:

Step 1. Determining a first projection position of the aircraft in a probe plane;

Herein, the distance between the probe plane and the unmanned aerial vehicle is L, and the probe plane is vertical to the moving direction of the unmanned aerial vehicle.

In some exemplary embodiments, the step 1 can be achieved through the following three substeps:

Substep 1.1: Acquiring a three-dimensional size of the unmanned aerial vehicle.

Each unmanned aerial vehicle has a precise three-dimensional size as being manufactured, and the three-dimensional size is often stored in related program of the unmanned aerial vehicle as three-dimensional model information; in the present substep, the three-dimensional size can be directly acquired from the related program.

Substep 1.2: Determining an angle between the depth of field sensor and an initial direction of the aircraft.

The infrared laser depth of field sensor capable of 360-degree free rotation in FIG. 2 is connected to the unmanned aerial vehicle via double shafts or multiple shafts, and at any time the infrared laser depth of field sensor capable of 360-degree free rotation can sense the instant angle of each shaft. Each instant shaft angle of the infrared laser depth of field sensor capable of 360-degree free rotation is defined as an angle between the depth of field sensor and the initial direction of the unmanned aerial vehicle.

Substep 1.3: Projecting the aircraft in the probe plane according to the three-dimensional size and the angle.

Figure 7:
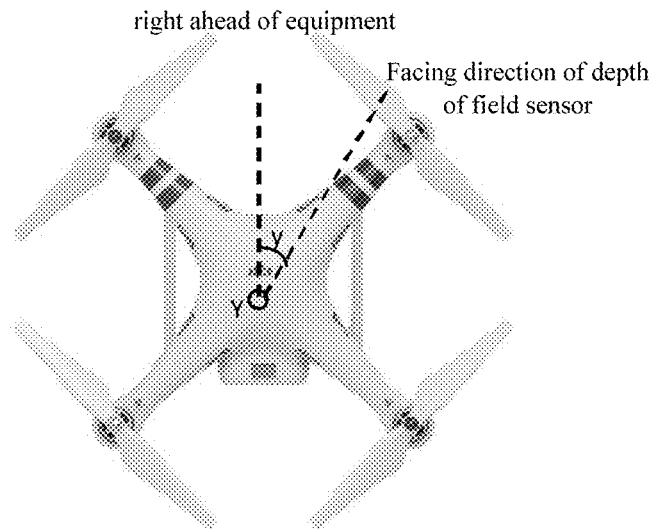
FIG. 7 is a top view of an unmanned aerial vehicle according to another embodiment of the present disclosure.

The infrared laser depth of field sensor capable of 360-degree free rotation can rotate around X axis and Y axis, and the direction facing the right ahead in FIG. 2 is defined as the positive direction. Observe Y axis from top, as shown in FIG. 7, Y axis is upward and vertical to the apparatus.

If the infrared laser depth of field sensor capable of 360-degree free rotation rotates clockwise by the angle y along the Y axis, it is known that the projection component along the Y axis is y+180° when the unmanned aerial vehicle is falling; similarly, if the sensor rotates by the angle x along the X axis, the projection component along the X axis is x+180°.

Figure 8:
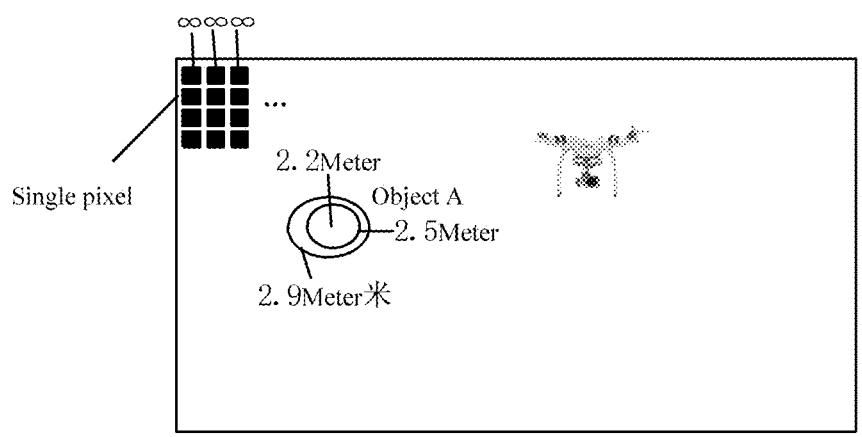
FIG. 8 is a projection diagram of an unmanned aerial vehicle in a three-dimensional obstacle information diagram according to another embodiment of the present disclosure.

Suppose (x+180°, y+180°) to be a 3D model projection angle of the unmanned aerial vehicle, the shape of the unmanned aerial vehicle in the depth of field sensor can be obtained. The size of the unmanned aerial vehicle is known in step 1, the size of the photosensitive device of the infrared laser depth of field sensor capable of 360-degree free rotation and the lens focal length are also known, so the unmanned aerial vehicle knows the actual size of the projection image at the L position in the probe image, as shown in FIG. 8.

Substep 1.4: Defining a projection position of the aircraft in the probe plane as the first projection position.

Step 2: Determining a scanning position of the object in the probe plane, a distance between the probe plane and the aircraft being L, and the probe plane being vertical to a moving direction of the aircraft.

In step 303, the distance between the three-dimensional obstacle information diagram and the unmanned aerial vehicle is L, and the probe plane is vertical to the moving direction of the unmanned aerial vehicle, thus, the three-dimensional obstacle information diagram in step 303 is a part of the probe plane, the three-dimensional obstacle information diagram in step 303 can be directly acquired in step 2, the diagram is regarded as the projection result of the object A in the probe plane, and the projection position of the object A in the diagram is defined as the scanning position.

As for the implementation order of step 1 and step 2, as an illustration, in this embodiment step 1 is followed by step 2, in practical applications, step 2 can be followed by step 1, or step 1 and step 2 are carried out simultaneously. The embodiment has no restriction on the implementation order of step 1 and step 2.

Step 3: Predicting, according to the first projection position, the horizontal velocity $V_h$, the vertical velocity $V_v$, and the preset distance L, a second projection position of the aircraft in the probe plane after the aircraft flies the preset distance L.

Step 3 can be implemented based on the following two substeps:

Substep 3.1: predicting, according to the horizontal velocity $V_h$, the vertical velocity $V_v$, and the preset distance L, a longitudinal moving distance s of the aircraft in the probe plane after the aircraft flies the preset distance L, and the distance s can be predicted according to the following formula:

$$s = \frac{L \times \tan\left(\arctan\left(\left(V_v + g \times L / \sqrt{V_h^2 + V_v^2}\right) / V_h\right) - \arctan(V_v/V_h)\right)}{a}$$

in which, g is gravitational acceleration, and a is a preset scaled-down constant. The formula can be deduced as follows:

In step 302, the flight velocity V, the horizontal velocity $V_h$, the vertical velocity $V_v$ of the unmanned aerial vehicle are known, the direction of the flight velocity V is horizontally downward and forms an included angle of β degree with the horizontal plane. In the substep 1.3 of step 304, the angular velocity between the infrared laser depth of field sensor capable of 360-degree free rotation and the X, Y axis of the body of the unmanned aerial vehicle are known, which are supposed to be $\omega_x$ and $\omega_y$, respectively.

Irrespective of the influence of the air speed, in the process of free fall, the horizontal velocity $V_h$ remain unchanged theoretically, while the vertical velocity $V_v$ gradually increases due to the gravitational acceleration.

In the non-free fall, both the horizontal velocity $V_h$ and the vertical velocity $V_v$ change, however, the unmanned aerial vehicle can still acquire the horizontal velocity $V_h$ and the vertical velocity $V_v$ at any moment, and predict the movement according the falling track.

Figure 9:
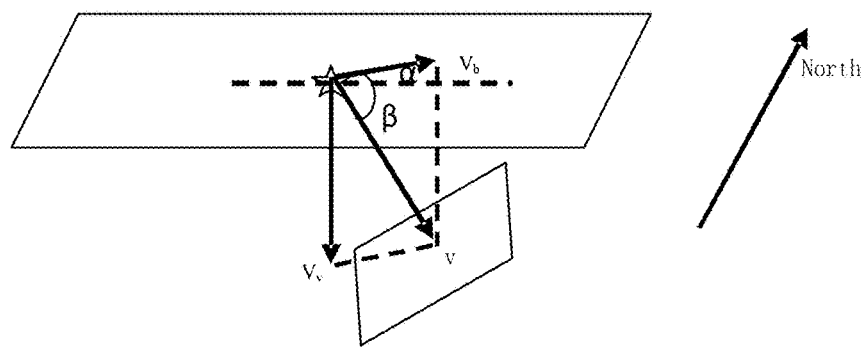
FIG. 9 is a projection position diagram of an unmanned aerial vehicle in a three-dimensional obstacle information diagram according to another embodiment of the present disclosure.

Hereinbelow, the embodiment takes the free fall as an example for further analysis. When the detected distance is L, it is known that the time the unmanned aerial vehicle flies to the probe plane which is L away from the unmanned aerial vehicle is approximately L/V, as shown in FIG. 9.

Suppose, after the time of L/V, the vertical velocity $V_v$ is changed into $V_v'$, Then $v_v'=v_v+g\times L/v$, and then $$\beta'=\arctan(v_v'/v_h)$$

Figure 10:
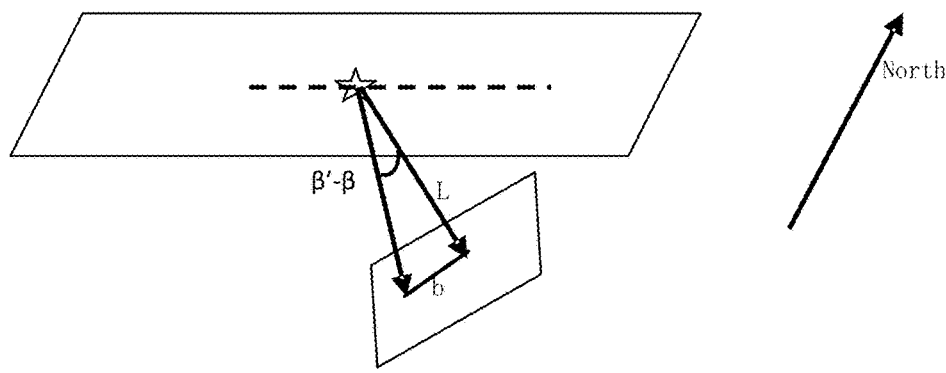
FIG. 10 is a projection displacement diagram of an unmanned aerial vehicle in a three-dimensional obstacle information diagram according to another embodiment of the present disclosure.

Suppose, after the time of L/V, the longitudinal moving distance of the projection image of the unmanned aerial vehicle in the probe image before the time of L/V is b (in the process of free fall, the horizontal velocity and direction remain unchanged, so there is no horizontal movement in the probe image), as shown in FIG. 10.

It is known $b=L\times\tan(\beta'-\beta)$, by substitution, to yield:

$$b=L\times\tan(\arctan((v_v+g\times L/\sqrt{v_h^2+v_v^2})/-\arctan(v_v/v_h))$$

b is the actual longitudinal moving distance, in the actual area of the infrared laser depth of field sensor capable of 360-degree free rotation, the moving distance and the actual distance are shrunk geometrically, the shrinking ratio is a known parameter after the infrared laser depth of field sensor capable of 360-degree free rotation and the lens group are manufactured. Suppose the shrinking ratio outside the distance L is a constant a, the longitudinal moving distance in the infrared laser depth of field sensor capable of 360-degree free rotation is:

$$s=\frac{b}{a}=\frac{L\times\tan\left(\arctan\left(\left(V_v+g\times L/\sqrt{V_h^2+V_v^2}\right)/v_h\right)-\arctan(V_v/V_h)\right)}{a}$$

Substep 3.2: Defining a position of the first projection position after longitudinally moving the distance s as the second projection position.

Figure 11:
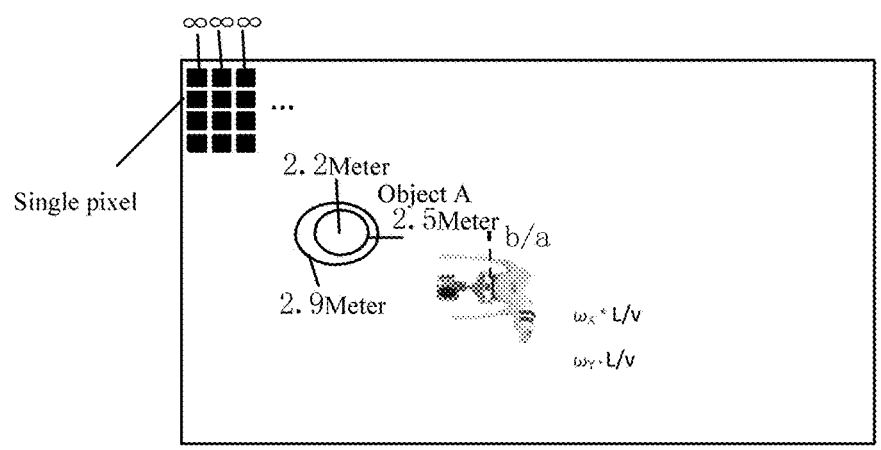
FIG. 11 is a projection diagram of another unmanned aerial vehicle in a three-dimensional obstacle information diagram according to another embodiment of the present disclosure.

After acquiring the distance s, and the angular velocity between the infrared laser depth of field sensor capable of 360-degree free rotation and the X, Y axis of the body of the unmanned aerial vehicle are known to be $\omega_x$ and $\omega_y$, respectively, which remain unchanged in the process of free fall, thus, after the time of L/v, the rotation angles of the unmanned aerial vehicle around X axis and Y axis are $\omega_x\times L/v$ and $\omega_y\times L/v$, respectively; suppose, after the time of L/v, the position of the unmanned aerial vehicle after longitudinally moving the distance s from the first projection position in the probe image before the time of L/v is as shown in FIG. 11, then the position is defined as the second projection position.

Step 4: Defining a position relationship between the second projection position and the scanning position as the position relationship between the aircraft and the object after the aircraft flies the preset distance L.

If the second projection position and the scanning position are partially overlapped, it is determined that the unmanned aerial vehicle, after flying the distance L, will collide with the object A.

If the second projection position and the scanning position are not overlapped at all, and the distance between the second projection position and the scanning position in the scanning image is c, then it is determined that the unmanned aerial vehicle, after flying the distance L, will not collide with the object A, and the actual distance between the unmanned aerial vehicle and the object A is c×a.

305. Controlling the aircraft, by using a preset control measure, if the position relationship meets a preset relationship.

Herein, the preset control measure includes but is not limited to: ejecting a gasbag, or disintegrating the aircraft.

If the preset relationship is that the positions of the unmanned aerial vehicle and the object A are partially overlapped, only the position, determined in step 304, of the unmanned aerial vehicle after flying the distance L and the position of the object A are partially overlapped, the preset control measure is adopted to control the unmanned aerial vehicle.

If the preset relationship is that the actual distance between the unmanned aerial vehicle and the object A is no greater than e, one the one hand, when the position, determined in step 304. of the unmanned aerial vehicle after flying the distance L and the position of the object A are partially overlapped, the preset control measure is adopted to control the unmanned aerial vehicle; on the other hand, when the position, determined in step 304, of the unmanned aerial vehicle after flying the distance L and the position of the object A are not overlapped at all, and the actual distance between the unmanned aerial vehicle and the object A is c×a which is no greater than e, the preset control measure is adopted to control the unmanned aerial vehicle.

Thus, through predicting the current moving status of the unmanned aerial vehicle, it is known whether the unmanned aerial vehicle, after flying the distance L, will collide with the object A.

For example, if it is predicted that the unmanned aerial vehicle, after flying the distance L, will collide with the object A (pedestrians, ground, buildings, or the like), the emergency protection device of the unmanned aerial vehicle is activated, including ejecting a gasbag, or disintegrating the aircraft, or the like, which can not only prevent the unmanned aerial vehicle from destroying, but also protect the pedestrians or properties from injury and damage.

The embodiment provides a method for preventing the collision of falling unmanned aerial vehicles. The unmanned aerial vehicles are equipped with an infrared laser depth of field sensor capable of 360-degree free rotation, which can real-time point to the current velocity direction. Through such technologies as the ultra-high frequency scanning laser ranging at the L position or pattern-based full depth of field analysis, in combination with the projection image of the profile of the unmanned aerial vehicle at the instant moment and angle, and based on the bidirectional components and rotation velocity of the current velocity in the projection plane, it can be predicted whether the collision will happen. If the collision is about to happen, the emergency mechanism is activated (such as ejecting a gasbag, or disintegrating the aircraft, or the like), so as to prevent the damage of the unmanned aerial vehicle, pedestrians or properties to the utmost. With the increasingly wide use of the unmanned aerial vehicles, the method provided by the embodiment can greatly improve the safety of the apparatus, objects and pedestrians on the ground.

In some exemplary embodiments, the embodiment only takes the unmanned aerial vehicle in FIG. 2 which is equipped with one infrared laser depth of field sensor capable of 360-degree free rotation as an example to explain and describe. In practical applications, because the sight line of the infrared laser depth of field sensor capable of 360-degree free rotation may be blocked, or other problems, two or more infrared laser depth of field sensors capable of 360-degree free rotation can be mounted, the embodiment does not limit the number of the sensors. When the unmanned aerial vehicle is equipped with a plurality of infrared laser depth of field sensors capable of 360-degree free rotation, all the data acquired by the infrared laser depth of field sensors capable of 360-degree free rotation can be integrated and used as the final data acquired by the infrared laser depth of field sensors capable of 360-degree free rotation for subsequent treatment.

The method for preventing the collision of a falling unmanned aerial vehicle of the embodiment of the present disclosure starts to implement when the unmanned aerial vehicle begins falling, and the implementation is continuous and repetitive, that is to say, the method for preventing the collision of a falling unmanned aerial vehicle of the embodiment, through acquiring the horizontal velocity $V_h$ and the vertical velocity $V_v$ of the unmanned aerial vehicle and acquiring an object along the moving direction of the unmanned aerial vehicle, the distance between the object and the unmanned aerial vehicle being no greater than a preset distance L, can adopt a preset anti-collision measure when the unmanned aerial vehicle is about to collide with the object, thus preventing the collision of the unmanned aerial vehicle with the object in the falling process.

Advantages of the method for controlling an aircraft are summarized as follows. The method includes determining a horizontal velocity $V_h$ and a vertical velocity $V_v$ of an unmanned aerial vehicle; acquiring an object along a moving direction of the unmanned aerial vehicle, a distance between the object and the unmanned aerial vehicle being no greater than a preset distance L; predicting, according to the horizontal velocity $V_h$, the vertical velocity $V_v$, and the preset distance L, a position relationship between the unmanned aerial vehicle and the object after the unmanned aerial vehicle flies the preset distance L; and controlling the unmanned aerial vehicle, by using a preset control measure, if the position relationship meets a preset relationship, thus achieving the control of the unmanned aerial vehicle after falling happens.

The above embodiment explains the method for controlling an aircraft by illustrating an unmanned aerial vehicle and one object which is no greater than L away from the unmanned aerial vehicle. According to the abovementioned implementing environment, when there are multiple objects no greater than L away from the unmanned aerial vehicle, the present application provides another method for controlling the unmanned aerial vehicle.

In this embodiment, still take the unmanned aerial vehicle equipped with an infrared laser depth of field sensor capable of 360-degree free rotation in FIG. 2 as an example, and the probe direction of the infrared laser depth of field sensor capable of 360-degree free rotation is always the same as the moving direction of the unmanned aerial vehicle.

Figure 12:
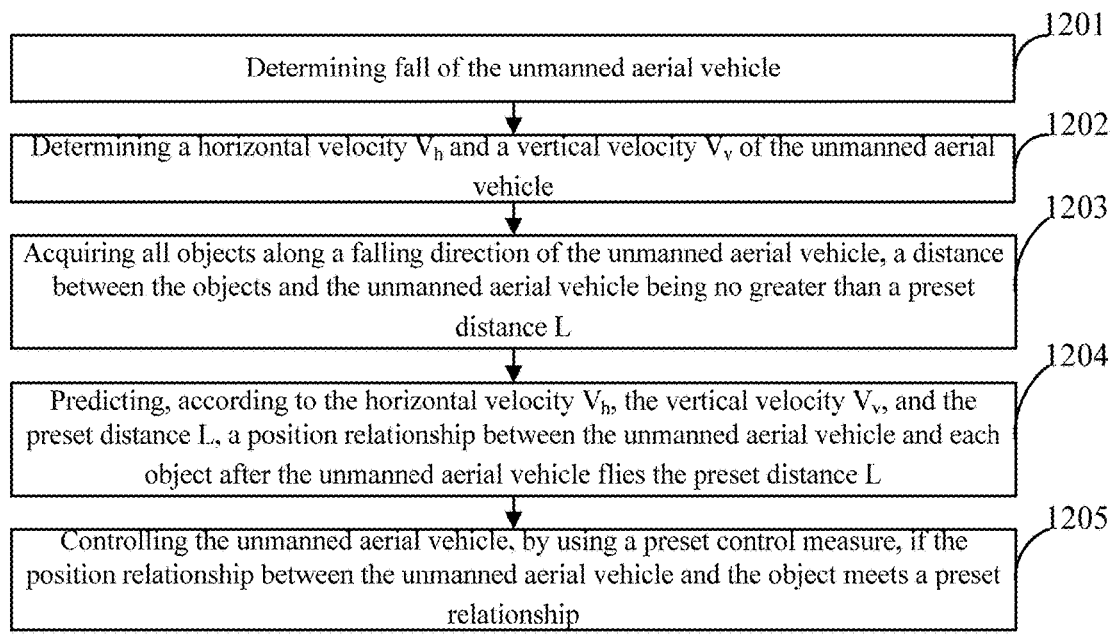
FIG. 12 is a flow chart of another method for controlling an aircraft according to another embodiment of the present disclosure.

As shown in FIG. 12, the method of the embodiment includes the following steps:

1201. Determining fall of the unmanned aerial vehicle.

The implementation mode in this step is the same as that in step 301, please see step 301 for details, which need not be repeated here.

1202. Determining a horizontal velocity $V_h$ and a vertical velocity $V_v$ of the UAV.

The implementation mode in this step is the same as that in step 302, please see step 302 for details, which need not be repeated here.

1203. Acquiring all objects along a moving direction of the unmanned aerial vehicle, a distance between the objects and the unmanned aerial vehicle being no greater than a preset distance L.

Because there is a plurality of objects which are no greater than a preset distance L away from the unmanned aerial vehicle in the moving direction of the unmanned aerial vehicle, this step is required to acquire all the objects which are no greater than a preset distance L away from the unmanned aerial vehicle.

For each object, the implementation mode in this step is the same as that in the step 303, please see step 303 for details, which need not be repeated here.

Figure 13:
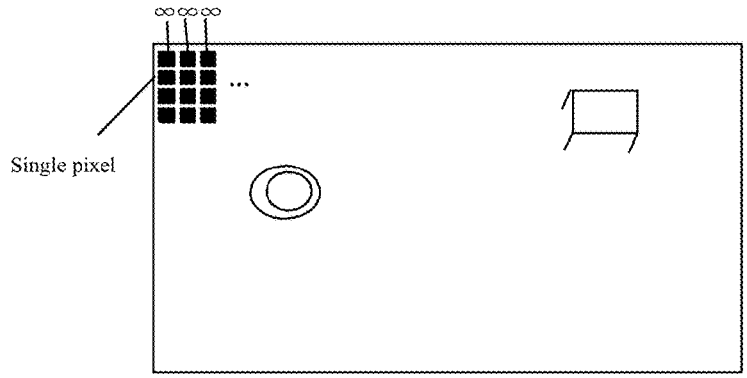
FIG. 13 is another obstacle information diagram according to another embodiment of the present disclosure.
Figure 14:
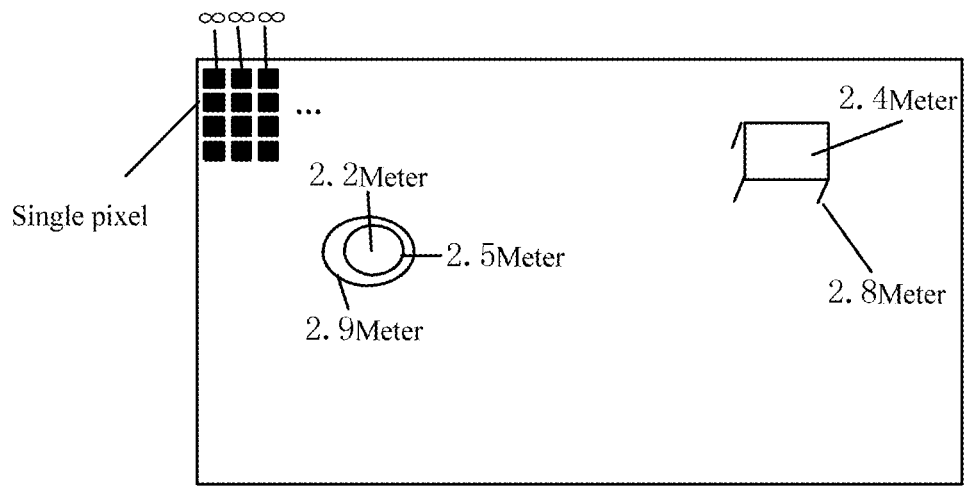
FIG. 14 is another three-dimensional obstacle information diagram according to another embodiment of the present disclosure.

For example, the infrared laser depth of field sensor capable of 360-degree free rotation performs real-time depth of field scanning within the distance L, to yield an obstacle information diagram as shown in FIG. 13. The infrared laser depth of field sensor capable of 360-degree free rotation can also perform distance measurement in the visible region, to yield a three-dimensional obstacle information diagram as shown in FIG. 14.

1204. Predicting, according to the horizontal velocity $V_h$, the vertical velocity $V_v$, and the preset distance L, a position relationship between the unmanned aerial vehicle and each object after the unmanned aerial vehicle flies the preset distance L.

For each object, the implementation mode for predicting, according to the horizontal velocity $V_h$, the vertical velocity $V_v$, and the preset distance L, a position relationship between the unmanned aerial vehicle and each object after the unmanned aerial vehicle flies the preset distance L is the same as that in step 304, please see step 304 for details, which need not be repeated here.

1205. Controlling the unmanned aerial vehicle, by using a preset control measure, if the position relationship between the unmanned aerial vehicle and the object meets a preset relationship.

Determine, respectively, whether the position relationship between the unmanned aerial vehicle and each object meets a preset relationship, if there is one object, of which the position relationship with the unmanned aerial vehicle meets a preset relationship, then a preset control measure is adopted to control the unmanned aerial vehicle.

The implementation mode for determining whether a position relationship between the unmanned aerial vehicle and each object after the unmanned aerial vehicle flies the preset distance L meets a preset relationship is the same as that in step 305, please see step 305 for details, which need not be repeated here.

Advantages of the method and an apparatus for controlling an unmanned aerial vehicle are summarized as follows. The method includes determining a horizontal velocity $V_h$ and a vertical velocity $V_v$ of an unmanned aerial vehicle; acquiring all objects along a moving direction of the unmanned aerial vehicle, a distance between all the objects and the unmanned aerial vehicle being no greater than a preset distance L; predicting, according to the horizontal velocity $V_h$, the vertical velocity $V_v$, and the preset distance L, a position relationship between the unmanned aerial vehicle and the objects after the unmanned aerial vehicle flies the preset distance L; and controlling the unmanned aerial vehicle, by using a preset control measure, if the position relationship between the unmanned aerial vehicle and at least one object meets a preset relationship, thus achieving the control of the unmanned aerial vehicle after falling happens.

Figure 15:
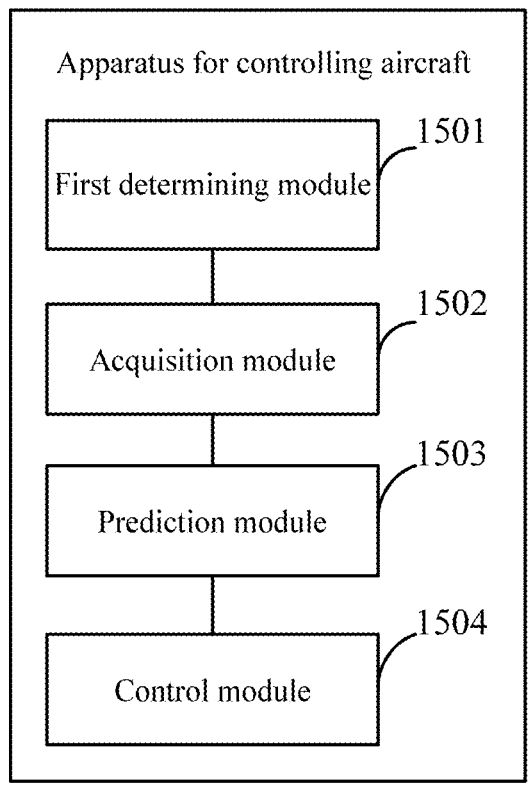
FIG. 15 is a schematic diagram of an apparatus for controlling an aircraft according to another embodiment of the present disclosure.

Based on the same inventive concept, the embodiment in FIG. 15 provides an apparatus for controlling an aircraft. The principle for controlling an aircraft of the apparatus is basically the same as that in the method for controlling the aircraft, so the implementation mode of the apparatus for controlling the aircraft is the same as that in the method, which need not be repeated here.

As shown in FIG. 15, the apparatus for controlling an aircraft includes:

a first determining module 1501, being configured to determine a horizontal velocity $V_h$ and a vertical velocity $V_v$ of an aircraft;

an acquisition module 1502, being configured to acquire an object along a moving direction of the aircraft, a distance between the object and the aircraft being no greater than a preset distance L;

a prediction module 1503, being configured to predict, according to the horizontal velocity $V_h$, the vertical velocity $V_v$, and the preset distance L determined by the first determining module 1501, a position relationship between the aircraft and the object acquired by the acquisition module 1502 after the aircraft flies the preset distance L; and a control module 1504, being configured to control the aircraft, by using a preset control measure, if the position relationship predicted by the prediction module 1503 meets a preset relationship.

Figure 16:
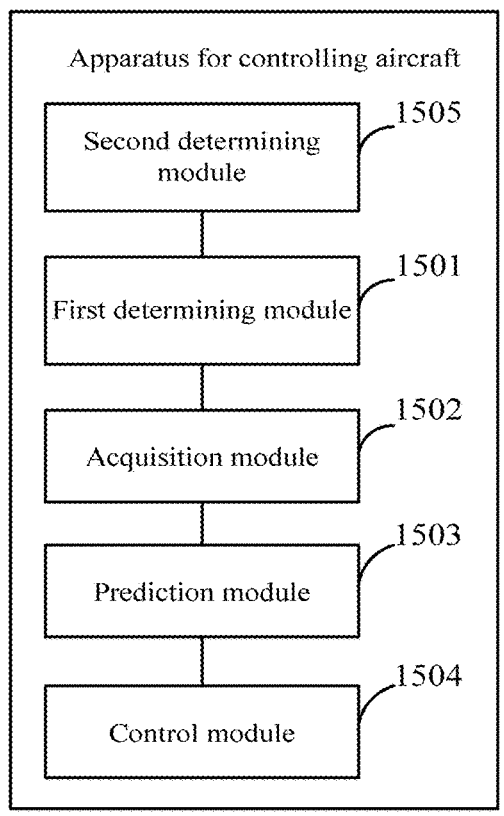
FIG. 16 is a schematic diagram of another apparatus for controlling an aircraft according to another embodiment of the present disclosure.
Figure 17:
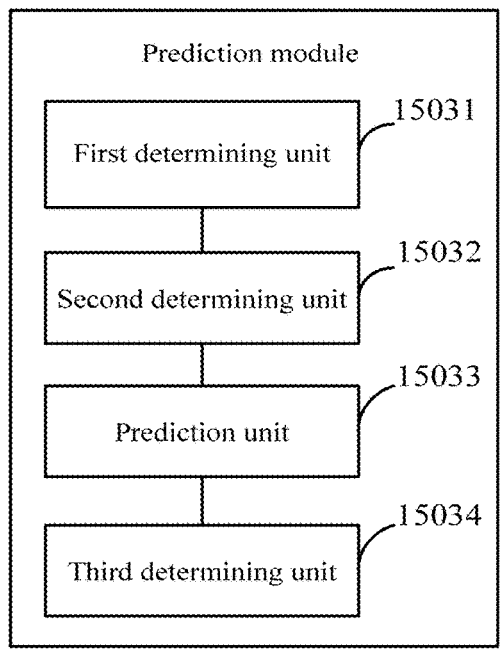
FIG. 17 is a schematic diagram of a prediction module according to another embodiment of the present disclosure.

As shown in FIG. 16, the apparatus further includes:

a second determining module 1505, being configured to determine fall of the aircraft.

As shown in FIG. 1 the prediction module 1503 includes:

a first determining unit 15031, being configured to determine a first projection position of the aircraft in a probe plane, a distance between the probe plane and the aircraft being L, and the probe plane being vertical to a moving direction of the aircraft;

a second determining unit 15032, being configured to determine a scanning position of the object in the probe plane;

a prediction unit 15033, being configured to predict, according to the first projection position, the horizontal velocity $V_h$, the vertical velocity $V_v$, and the preset distance L determined by the first determining unit 15031, a second projection position of the aircraft in the probe plane after the aircraft flies the preset distance L; and a third determining unit 15034, being configured to define a position relationship between the second projection position predicted by the prediction unit 15033 and the scanning position determined by the second determining unit 15032 as the position relationship between the aircraft and the object after the aircraft flies the preset distance L.

In some embodiments, the aircraft is equipped with a depth of field sensor, and a probe direction of the depth of field sensor is the same as the moving direction of the aircraft; and the acquisition module 1502 is configured to acquire an object probed by the depth of field sensor with the preset distance Las a depth of field.

Figure 18:
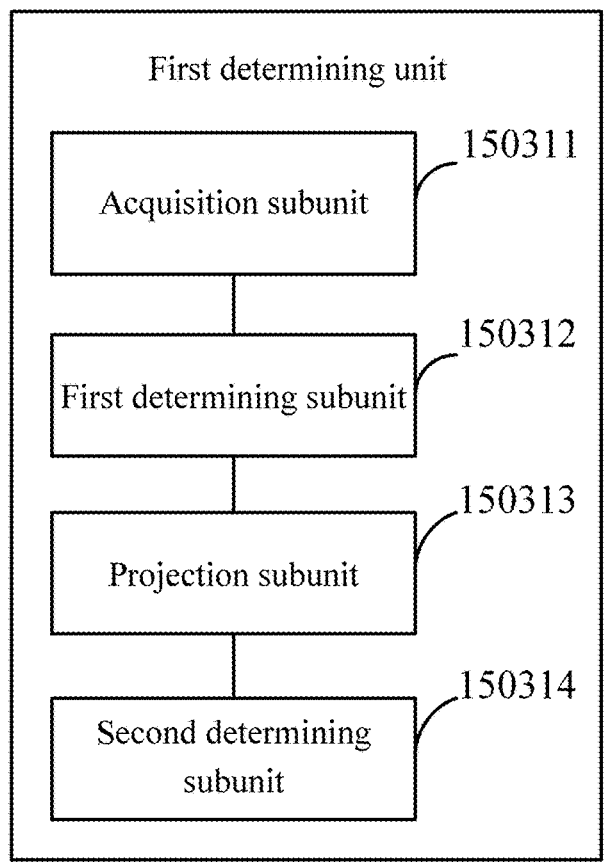
FIG. 18 is a schematic diagram of a first determining unit according to another embodiment of the present disclosure.

As shown in FIG. 18, the first determining unit 15031 includes:

an acquisition subunit 150311, being configured to acquire a three-dimensional size of the aircraft;

a first determining subunit 150312, being configured to determine an angle between the depth of field sensor and an initial direction of the aircraft;

a projection subunit 150313, being configured to project the aircraft in the probe plane according to the three-dimensional size acquired by the acquisition subunit 150311 and the angle determined by the first determining subunit 150312; and a second determining subunit 150314, being configured to define a projection position of the aircraft projected by the projection subunit 150313 in the probe plane as the first projection position.

Figure 19:
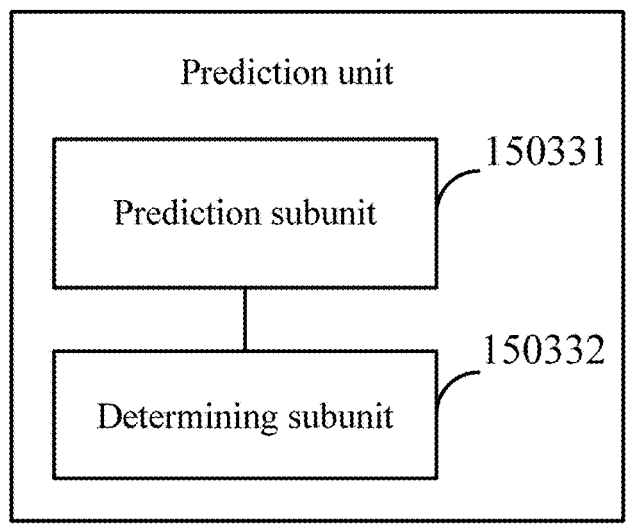
FIG. 19 is a schematic diagram of a prediction unit according to another embodiment of the present disclosure.

As shown in FIG. 19, the prediction unit 15033 includes:

a prediction subunit 150331, being configured to predict, according to the horizontal velocity $V_h$, the vertical velocity $V_v$, and the preset distance L, a longitudinal moving distance s of the aircraft in the probe plane after the aircraft flies the preset distance L; and a determining subunit 150332, being configured to define a position of the first projection position after longitudinally moving the distance s predicted by the prediction subunit 150331 as the second projection position.

In some exemplary embodiments, the prediction subunit predicts the distance s according to the following formula:

$$s = \frac{L \times \tan\left(\arctan\left(\left(V_v + g \times L / \sqrt{V_h^2 + V_v^2}\right) / V_h\right) - \arctan(V_v / V_h)\right)}{a}$$

in which, g is gravitational acceleration, and a is a preset scaled-down constant.

In some exemplary embodiments, the preset control measure includes: ejecting a gasbag, or disintegrating the aircraft.

Advantages of the method and apparatus for controlling an aircraft are summarized as follows. The method includes determining a horizontal velocity $V_h$ and a vertical velocity $V_v$ of an aircraft; acquiring, along a moving direction of the aircraft, an object which is no greater than a preset distance L away from the aircraft; predicting, according to the horizontal velocity $V_h$, the vertical velocity $V_v$, and the preset distance L, a position relationship between the aircraft and the object after the aircraft flies the preset distance L; and controlling the aircraft, by using a preset control measure, if the position relationship meets a preset relationship, thus achieving the control the aircraft after falling happens.

All the above embodiments can be implemented by employing existing functional component modules. For example, the processing module may adopt existing data processing components, at least the location server used in existing location technology has the components capable of achieving the functions; as for the receiving module, it is a common component possessed by any device having signal transmission function; in the meanwhile, the calculation of the parameters A, n and the intensity adjustment performed by the processing module are both conventional technological means, which is easy to implement by one of ordinary skill in the art through corresponding design and development.

For the convenience of description, the components of the apparatus are divided into different modules or units according to the functions and are described independently. Certainly, the functions of the modules or units can be implemented in one or more software or hardware for implementing the present disclosure.

Figure 20:
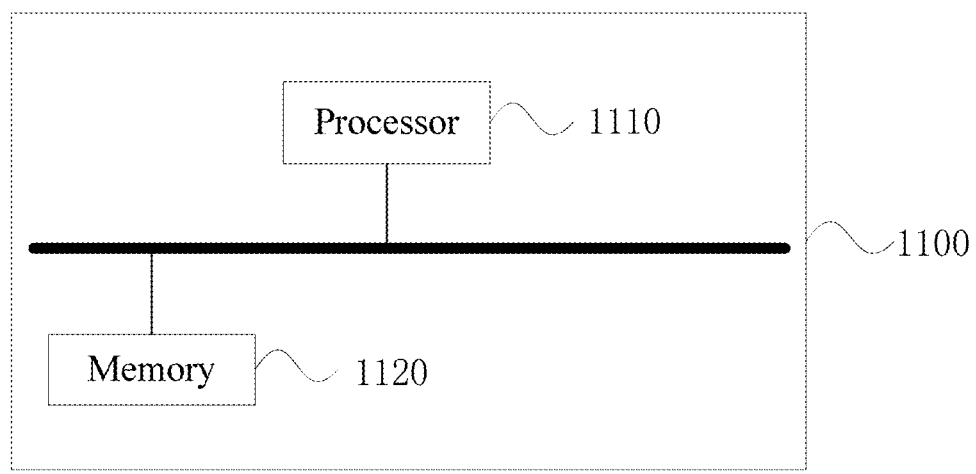
FIG. 20 is a schematic structural diagram of an apparatus for controlling an aircraft according to an embodiment of the present disclosure.

FIG. 20 is a schematic structural diagram of an apparatus 1100 for controlling an aircraft according to an embodiment of the present disclosure. The apparatus 1100 includes: a processor 1110 and a memory 1120. The memory 1120 is communicably connected with the processor 1110. The memory 1120 is configured to store programs, and the processor 1110 is configured to execute the programs stored in the memory 1120, the programs includes:

a first determining module, being configured to determine a horizontal velocity $V_h$ and a vertical velocity $V_v$ of an aircraft;

an acquisition module, being configured to acquire an object along a falling direction of the aircraft, a distance between the object and the aircraft being no greater than a preset distance L;

a prediction module, being configured to predict, according to the horizontal velocity $V_h$, the vertical velocity $V_v$, and the preset distance L determined by the first determining module, a position relationship between the aircraft and the object acquired by the acquisition module after the aircraft flies the preset distance L; and a control module, being configured to control the aircraft, by using a preset control measure, if the position relationship predicted by the prediction module meets a preset relationship;

wherein the prediction module includes:

a first determining unit, being configured to determine a first projection position of the aircraft in a probe plane, a distance between the probe plane and the aircraft being L, and the probe plane being vertical to a moving direction of the aircraft;

a second determining unit, being configured to determine a scanning position of the object in the probe plane;

a prediction unit, being configured to predict, according to the first projection position, the horizontal velocity $V_h$, the vertical velocity $V_v$, and the preset distance L determined by the first determining unit, a second projection position of the aircraft in the probe plane after the aircraft flies the preset distance L; and a third determining unit, being configured to define a position relationship between the second projection position predicted by the prediction unit and the scanning position determined by the second determining unit as the position relationship between the aircraft and the object after the aircraft flies the preset distance L.

The programs further includes other modules, configured to perform the aforesaid methods for controlling an aircraft. For brevity of description, the details are not given herein any further.

It is well-known to one of ordinary skill in the art that the embodiments of the present disclosure can be presented in the form of methods, systems, or computer program products. Thus, the present disclosure can adopt full hardware embodiments, full software embodiments, or software-hardware combination embodiments. The present disclosure can adopt the form of a computer program product implemented in one or more computer readable storage media (including but not limited to disk memory, CD-ROM, optical memory, or the like) including computer readable program codes.

The present disclosure is described according to flowcharts and/or block diagrams of the methods, apparatus (systems) and computer program products in embodiment of the present disclosure. It should be understandable that the computer program command can implement each procedure and/or block of the flowcharts and/or block diagrams, as well as the combination of the procedure and/or block of the flowcharts and/or block diagrams. The computer program commands can be provided to a processor of a general computer, special computer, embedded processor or other programmable data processing equipment to generate a machine, which enables the command executed by the processor of a general computer, special computer, embedded processor or other programmable data processing equipment to produce a device capable of implementing the function designated by one or more procedures in the flow chart and/or one or more blocks in the block diagram.

In some embodiments, the computer program commands can also be stored in a computer readable memory which can guide the computers or other programmable data processing equipment to work in a specific mode, so that the computer program commands stored in the computer readable memory produce manufactures including command devices, which can implement the function designated by one or more procedures in the flow chart and/or one or more blocks in the block diagram.

In some embodiments, the computer program commands can also be loaded to a computer or other programmable data processing equipment, so as to execute a series of operation steps on the computer or other programmable data processing equipment to produce computer executable processing, so that the commands executed on the computer or other programmable data processing equipment provide the step to implement the function designated by one or more procedures in the flow chart and/or one or more blocks in the block diagram.

Finally it shall be noted that, the above embodiments are only used to describe but not to limit the technical solutions of the present disclosure; and within the concept of the present disclosure, technical features of the above embodiments or different embodiments may also be combined with each other, the steps may be implemented in an arbitrary order, and many other variations in different aspects of the present disclosure described above are possible although, for purpose of simplicity, they are not provided in the details. Although the present disclosure has been detailed with reference to the above embodiments, those of ordinary skill in the art shall appreciate that modifications can still be made to the technical solutions disclosed in the above embodiments or equivalent substations may be made to some of the technical features, and the corresponding technical solutions will not depart from the scope of the present disclosure due to such modifications or substations.

What is claimed is:

1. A method for controlling an aircraft, comprising:
    determining fall of the aircraft;
    determining a horizontal velocity $V_h$ and a vertical velocity $V_v$ of the aircraft;
    acquiring, along a moving direction of the aircraft, an object having a distance that is no greater than a preset distance L away from the aircraft;
    predicting, according to the horizontal velocity $V_h$, the vertical velocity $V_v$, and the preset distance L, a position relationship between the aircraft and the object after the aircraft flies the preset distance L; and
    controlling the aircraft, by using a preset control measure, if the position relationship meets a preset relationship;
    wherein the predicting, according to the horizontal velocity $V_h$, the vertical velocity $V_v$, and the preset distance L, a position relationship between the aircraft and the object after the aircraft flies the preset distance L comprises:

determining a first projection position of the aircraft in a probe plane;
determining a scanning position of the object in the probe plane;
a distance between the probe plane and the aircraft being L, and the probe plane being vertical to a moving direction of the aircraft;
predicting, according to the first projection position, the horizontal velocity $V_h$, the vertical velocity $V_v$, and the preset distance L, a second projection position of the aircraft in the probe plane after the aircraft flies the preset distance L; and
defining a position relationship between the second projection position and the scanning position as the position relationship between the aircraft and the object after the aircraft flies the preset distance L;
wherein the preset relationship is that the positions of the aircraft and the object are partially overlapped, or the preset relationship is that the actual distance between the aircraft and the object is no greater than e, wherein the actual distance between the aircraft and the object is c×a, c denotes the distance between the second projection position and the scanning position, a denotes a shrinking ratio constant.

2. The method of claim 1, wherein the aircraft is equipped with a depth of field sensor, and a probe direction of the depth field sensor is the same as the moving direction of the aircraft; and
the acquiring, along a moving direction of the aircraft, an object having distance that is no greater than a present distance L away from the aircraft comprises:
acquiring an object probed by the depth of field sensor with the present distance L as depth of field.

3. The method of claim 2, wherein the determining a first projection position of the aircraft in a probe plane comprises:
acquiring a three-dimensional size of the aircraft;
determining an angle between the depth of field sensor and an initial direction of the aircraft;
projecting the aircraft in the probe plane according to the three-dimensional size and the angle; and
defining a projection position of the aircraft in the probe plane as the first projection position.

4. The method of claim 1, wherein the predicting, according to the first projection position, the horizontal velocity $V_h$, the vertical velocity $V_v$, and the preset distance L, a second projection position of the aircraft in the probe plane after the aircraft flies the preset distance L comprises:
predicting, according to the horizontal velocity $V_h$, the vertical velocity $V_v$, and the preset distance L, a longitudinal moving distance s of the aircraft in the probe plane after the aircraft flies the preset distance L; and
defining a position of the first projection position after longitudinally moving the distance s as the second projection position.

5. The method of claim 4, wherein the predicting, according to the horizontal velocity $V_h$, the vertical velocity $V_v$, and the preset distance L, a longitudinal moving distance s of the aircraft in the probe plane after the aircraft flies the preset distance L comprises:
predicting the longitudinal moving distance s according to the following formula:

$$s = \frac{L \times \tan\left(\arctan\left(\left(V_v + g \times L \big/ \sqrt{V_h^2 + V_v^2}\right) \big/ V_h\right) - \arctan(V_v/V_h)\right)}{a}$$

in which, g is gravitational acceleration, and a is a preset scaled-down constant.

6. The method of claim 1, wherein the preset control measure comprises: ejecting a gasbag, or disintegrating the aircraft.

7. An apparatus for controlling an aircraft, comprising:
at least one processor; and
a memory communicably connected with the at least one processor and storing one or more programs executable by the at least one processor, the one or more programs comprising:
a first determining module, being configured to determine a horizontal velocity $V_h$ and a vertical velocity $V_v$ of an aircraft;
a second determining module, being configured to determine fall of the aircraft;
an acquisition module, being configured to acquire an object along a falling direction of the aircraft, a distance between the object and the aircraft being no greater than a preset distance L;
a prediction module, being configured to predict, according to the horizontal velocity $V_h$, the vertical velocity $V_v$, and the preset distance L determined by the first determining module, a position relationship between the aircraft and the object acquired by the acquisition module after the aircraft flies the preset distance L; and
a control module, being configured to control the aircraft, by using a preset control measure, if the position relationship predicted by the prediction module meets a preset relationship;
wherein the prediction module comprises:
a first determining unit, being configured to determine a first projection position of the aircraft in a probe plane, a distance between the probe plane and the aircraft being L, and the probe plane being vertical to a moving direction of the aircraft;
a second determining unit, being configured to determine a scanning position of the object in the probe plane;
a prediction unit, being configured to predict, according to the first projection position, the horizontal velocity $V_h$, the vertical velocity $V_v$, and the preset distance L determined by the first determining unit, a second projection position of the aircraft in the probe plane after the aircraft flies the preset distance L; and
a third determining unit, being configured to define a position relationship between the second projection position predicted by the prediction unit and the scanning position determined by the second determining unit as the position relationship between the aircraft and the object after the aircraft flies the preset distance L;
wherein the preset relationship is that positions of the aircraft and the object are partially overlapped, or the preset relationship is that the actual distance between the aircraft and the object is no greater than e, wherein the actual distance between the aircraft and the object is c×a, c denotes the distance between the second projection position and the scanning position, a denotes a shrinking ratio constant.

8. The apparatus of claim 7, wherein the aircraft is equipped with a depth of field sensor, and a probe direction of the depth of field sensor is the same as the moving direction of the aircraft; and
the acquisition module is configured to acquire an object probed by the depth of field sensor with the preset distance L as a depth of field.

9. The apparatus of claim 8, wherein the first determining unit comprises:
  an acquisition subunit, being configured to acquire a three-dimensional size of the aircraft;
  a first determining subunit, being configured to determine an angle between the depth of field sensor and an initial direction of the aircraft;
  a projection subunit, being configured to project the aircraft in the probe plane according to the three-dimensional size acquired by the acquisition subunit and the angle determined by the first determining subunit; and
  a second determining subunit, being configured to define a projection position of the aircraft projected by the projection subunit in the probe plane as the first projection position.

10. The apparatus of claim 7, wherein the prediction unit comprises:
  a prediction subunit, being configured to predict, according to the horizontal velocity $V_h$, the vertical velocity $V_v$, and the preset distance L, a longitudinal moving distance s of the aircraft in the probe plane after the aircraft flies the preset distance L; and
  a determining subunit, being configured to define a position of the first projection position after longitudinally moving the distance s predicted by the prediction subunit as the second projection position.

11. The apparatus of claim 10, wherein the prediction subunit predicts the distance s according to the following formula:

$$s = \frac{L \times \tan\left(\arctan\left(\left(V_v + g \times L / \sqrt{V_h^2 + V_v^2}\right) / V_h\right) - \arctan(V_v / V_h)\right)}{a}$$

in which, g is gravitational acceleration, and a is a preset scaled-down constant.

12. The apparatus of claim 7, wherein the preset control measure comprises: ejecting a gasbag, or disintegrating the aircraft.

* * * * *